US009945291B2

(12) United States Patent
Tsutsumi et al.

(10) Patent No.: US 9,945,291 B2
(45) Date of Patent: Apr. 17, 2018

(54) ROTATING SHAFT SUPPORT STRUCTURE AND ROTARY MACHINE

(71) Applicant: MITSUBISHI HITACHI POWER SYSTEMS, LTD., Kanagawa (JP)

(72) Inventors: Eiichi Tsutsumi, Tokyo (JP); Takahiro Kondo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 290 days.

(21) Appl. No.: 14/779,039

(22) PCT Filed: Oct. 22, 2013

(86) PCT No.: PCT/JP2013/078619
§ 371 (c)(1),
(2) Date: Sep. 22, 2015

(87) PCT Pub. No.: WO2014/155798
PCT Pub. Date: Oct. 2, 2014

(65) Prior Publication Data
US 2016/0053687 A1    Feb. 25, 2016

(30) Foreign Application Priority Data

Mar. 29, 2013 (JP) ................................. 2013-072643

(51) Int. Cl.
*F02C 7/06* (2006.01)
*F16C 17/03* (2006.01)
(Continued)

(52) U.S. Cl.
CPC ................. *F02C 7/06* (2013.01); *F02C 3/04* (2013.01); *F16C 17/02* (2013.01); *F16C 17/03* (2013.01);
(Continued)

(58) Field of Classification Search
CPC .......... F16C 17/02; F16C 17/03; F16C 33/10; F16C 33/1045; F16C 33/106; F16C 33/1085; F02C 7/06
See application file for complete search history.

(56) References Cited

U.S. PATENT DOCUMENTS 2,012,461 A * 8/1935 Wyrick .................... F16C 17/10
384/368
4,396,197 A * 8/1983 Shimizu .................. F16C 33/10
277/346
(Continued)

FOREIGN PATENT DOCUMENTS

JP      62-62021      3/1987
JP      4-82426       7/1992
(Continued)

OTHER PUBLICATIONS

Written Opinion of the International Searching Authority dated Dec. 3, 2013 in International (PCT) Application No. PCT/JP2013/078619, with English translation.
(Continued)

*Primary Examiner* — James Pilkington
(74) *Attorney, Agent, or Firm* — Wenderoth, Lind & Ponack, L.L.P.

(57) ABSTRACT

A rotating shaft support structure and a rotary machine which can suppress the influence of lubricating oil on other devices. A rotating shaft support structure (journal bearing mechanism) and a rotary machine having the same includes: a bearing (journal bearing) which supports a rotating shaft, of which the surface facing the rotating shaft is supplied with lubricating oil by a direct lubrication method, and which is disposed inside a cavity holding a suction mechanism for recovering mist of the lubricating oil L leaking from the clearance between the rotating shaft and side plates; and at least one scattering prevention plate which is disposed on
(Continued)

the side of an end surface of the bearing in the axial direction of the rotating shaft, on the vertically upper side of the rotating shaft.

7 Claims, 10 Drawing Sheets

(51) Int. Cl.
*F16C 33/10* (2006.01)
*F16C 17/02* (2006.01)
*F02C 3/04* (2006.01)

(52) U.S. Cl.
CPC .......... *F16C 33/10* (2013.01); *F16C 33/1045* (2013.01); *F16C 33/1085* (2013.01); *F16C 2360/23* (2013.01)

(56) References Cited

U.S. PATENT DOCUMENTS

| | | | |
|---|---|---|---|
| 4,741,630 A | | 5/1988 | Oeynhausen et al. |
| 5,482,380 A | * | 1/1996 | Corratti ................... F16C 17/03 |
| | | | 384/309 |

FOREIGN PATENT DOCUMENTS

| | | |
|---|---|---|
| JP | 8-111954 | 4/1996 |
| JP | 8-111955 | 4/1996 |
| JP | 8-214490 | 8/1996 |
| JP | 9-60532 | 3/1997 |
| JP | 10-210701 | 8/1998 |
| JP | 11-89160 | 3/1999 |
| JP | 2000-213542 | 8/2000 |
| JP | 2004-92878 | 3/2004 |
| JP | 2005-240691 | 9/2005 |
| JP | 2010-203481 | 9/2010 |
| JP | 2010-249200 | 11/2010 |

OTHER PUBLICATIONS

International Search Report dated Dec. 3, 2013 in International (PCT) Application No. PCT/JP2013/078619, with English translation.
Office Action dated Nov. 2, 2016 in corresponding Chinese Application No. 201380075060.3, with English translation.
Decision of a Patent Grant dated Oct. 4, 2016 in Japanese Application No. 2013-072643, with English translation,.

* cited by examiner

ROTATING SHAFT SUPPORT STRUCTURE AND ROTARY MACHINE

TECHNICAL FIELD

The present invention relates to a rotating shaft support structure, which supports a rotating shaft in the radial direction, and a rotary machine

BACKGROUND ART

Rotary machines such as gas turbines and steam turbines are a mechanism which rotates a rotating shaft. Some of such rotary machines having a rotating shaft are provided with a journal bearing (radial bearing) in order to receive the radial force and regulate the radial position of the rotating shaft (see Patent Literature 1).

In this connection, a journal bearing described in Patent Literature 1 is equipped with a mechanism, which supplies lubricating oil directly to the surface of a bearing pad by a direct lubrication method, in order to reduce the resistance between a rotor and a stator during rotation of the rotating shaft. Patent Literature 2 describes a mechanism for recovering lubricating oil mist which is provided with a bearing cover and a duct through which air inside a cavity formed by the bearing cover is discharged.

The direct lubrication method among bearing lubrication methods is a method of supplying lubricating oil directly to the surface of a bearing pad by means of an oil supply nozzle etc. and discharging the oil in the axial direction. The flow of lubricating oil around a rotating shaft in this method will be described using FIG. 13 and FIG. 14. FIG. 13 shows the flow of lubricating oil viewed from the axial direction of the rotating shaft. FIG. 14 shows the flow of lubricating oil viewed from the radial direction of the rotating shaft. The lubricating oil is supplied from a supply pump, which is disposed in a lubricating oil circulation mechanism (not shown) integrated in the rotary machine, through a pipe to a bearing mechanism.

As one example, FIG. 13 shows a cross-sectional view of a journal bearing from the axial direction of the rotating shaft. A bearing 150 has a carrier ring 161 having an upper carrier ring 161a and a lower carrier ring 161b, and an upper bearing pad 163, a lower bearing pad 164, and oil supply nozzles 166 disposed on the rotating shaft 20 side of the carrier ring 161. Lubricating oil L is supplied from an oil supply hole 167 provided in the lower carrier ring 161b of the bearing 150 to an oil passage 165, and after passing through the oil passage 165 provided inside the lower carrier ring 161b in the circumferential direction of the rotating shaft 20, the lubricating oil L is discharged from the oil supply nozzles 166 disposed in the lower bearing pad 164 to the surface of the rotating shaft 20. The plurality of oil supply nozzles 166 are disposed in the circumferential direction.

As shown in FIG. 14, the lubricating oil L, which is discharged from the oil supply nozzles 166 to the clearance between the surface of the rotating shaft 20 and the inner peripheral surface of the bearing 150, flows along the surface of the rotating shaft 20 to the upstream side and the downstream side in the axial direction. Both ends in the axial direction of the bearing 150 are covered with side plates 155, 156 over the entire circumference around the rotating shaft. The lubricating oil L is discharged from the clearance between the side plates 155, 156 and the surface of the rotating shaft 20 into the cavity inside the bearing cover where the bearing is disposed. The cavity is maintained at a reduced pressure by being suctioned from the lubricating oil circulation mechanism so that the oil mist of the lubricating oil etc. does not leak from the bearing cover to the outside. The lubricating oil L discharged from the bearing 150 is accumulated as oil drain DR at the bottom of the cavity, and is returned to the lubricating oil circulation mechanism to be used cyclically. The oil mist inside the cavity is suctioned and recovered by a suction mechanism which is installed inside the cavity and has a suction opening.

CITATION LIST

Patent Literature

[Patent Literature 1]
  Japanese Patent Laid-Open No. 2010-203481
[Patent Literature 2]
  Japanese Patent Laid-Open No. 2005-240691

SUMMARY OF INVENTION

Technical Problem

As shown in FIG. 14, the lubricating oil discharged from the bearing is discharged to the cavity from the clearance between the side plates 155, 156 and the rotating shaft. However, when the rotating shaft 20 is rotating at a high speed, a phenomenon occurs that the discharged lubricating oil L does not flow down to the bottom of the cavity as the oil drain DR, but instead rotates around the rotating shaft 20 along with the rotating shaft 20 rotating at a high speed, and scatters in the radial direction orthogonal to the rotating shaft due to the centrifugal force. That is, immediately after its discharge from the side plates 155, 156, the lubricating oil flows in the radially outward direction along the side walls of the side plates 155, 156 due to the centrifugal force, and scatters from the entire circumference at the end of the side plates 155, 156 into the cavity. It is possible that part of spattered oil SL, which has scattered to the upper side of the cavity, may flow into the suction opening and clog the suction mechanism, disabling the operation of the rotary machine.

An object of the present invention, which solves the above-described problem, is to provide a rotating shaft support structure and a rotary machine which allow stable operation over a prolonged period of time by avoiding clogging etc. due to scattering of lubricating oil and suppressing the influence of lubricating oil on other devices including a suction mechanism.

Solution to Problem

In order to achieve the above object, the present invention provides a rotating shaft support structure including: a bearing which supports a rotating shaft, of which the surface facing the rotating shaft is supplied with lubricating oil by a direct lubrication method, and which is disposed inside a cavity holding a suction mechanism for recovering mist of the lubricating oil leaking from the rotating shaft; and at least one scattering prevention plate which is disposed on the side of an end surface of the bearing in the axial direction of the rotating shaft, on the vertically upper side of the rotating shaft.

According to the present invention, the scattering prevention plate can prevent the lubricating oil, which is discharged from between the bearing and the rotating shaft in the axial direction, from scattering to the vertically upper side. Thus, it is possible to suppress the influence of the lubricating oil on other devices such as clogging, and to operate the rotary machine stably over a prolonged period of time.

In the rotating shaft support structure of the present invention, the scattering prevention plate may be fixed on the bearing.

According to the present invention, the scattering prevention plate can be easily fitted and the installation at a desired position of the bearing is made easy.

The rotating shaft support structure of the present invention may include two scattering prevention plates, and one scattering prevention plate may be disposed on the side of one end surface of the bearing in the axial direction of the rotating shaft, while the other scattering prevention plate may be disposed on the side of the other end surface of the bearing in the axial direction of the rotating shaft.

According to the present invention, it is possible to further prevent scattering of lubricating oil by providing the scattering prevention plates at both ends of the bearing in the axial direction.

In the rotating shaft support structure of the present invention, the scattering prevention plate may have an inclined part, which is inclined in a direction away from the bearing in the axial direction as it extends radially inward, on the end surface on the radially inside of the rotating shaft.

Accordingly, it is possible to guide the lubricating oil to the vertically lower side, and to further prevent scattering of the lubricating oil.

In the rotating shaft support structure of the present invention, the scattering prevention plate may be disposed such that, when a tangent line of the rotating shaft is extended in a direction along the rotation direction, a tangent line in the horizontal direction or inclined to the vertically upper side from the horizontal direction and an inner peripheral region formed by the inner peripheral surface of the inclined part overlap with each other when the scattering prevention plate is viewed from the axial direction.

Accordingly, it is possible to more reliably prevent the lubricating oil from scattering to the vertically upper side.

In the rotating shaft support structure of the present invention, the bearing may be a journal bearing.

In order to achieve the above object, the present invention provides a rotary machine which has one of the above-described rotating shaft support structures.

According to the present invention, it is possible to suppress the influence of lubricating oil on other devices, and to operate the rotary machine stably over a prolonged period of time.

Advantageous Effects of Invention

According to the rotating shaft support structure and the rotary machine of the present invention, the scattering prevention plate can prevent the lubricating oil, which is discharged from between the bearing and the rotating shaft in the axial direction, from scattering to the vertically upper side. Thus, it is possible to cause the lubricating oil to fall to the vertically lower side, and to suppress the influence on other devices. As a result, the rotary machine can be operated stably over a prolonged period of time.

DESCRIPTION OF EMBODIMENT

In the following, a preferred embodiment of a rotating shaft support structure according to the present invention will be described in detail with reference to the accompanying drawings. The present invention is not limited by this embodiment, and where there are a plurality of embodiments, the present invention also includes embodiments configured by combining such embodiments. In this embodiment, a case where the rotary machine is a gas turbine will be described as a preferred embodiment. However, the present invention can also be applied to rotary machines other than gas turbines, for example, to steam turbines, various engines and pumps, etc. The rotating shaft support structure of this embodiment can achieve a more favorable effect when used in gas turbines which are large in device configuration.

Embodiment

Figure 1:
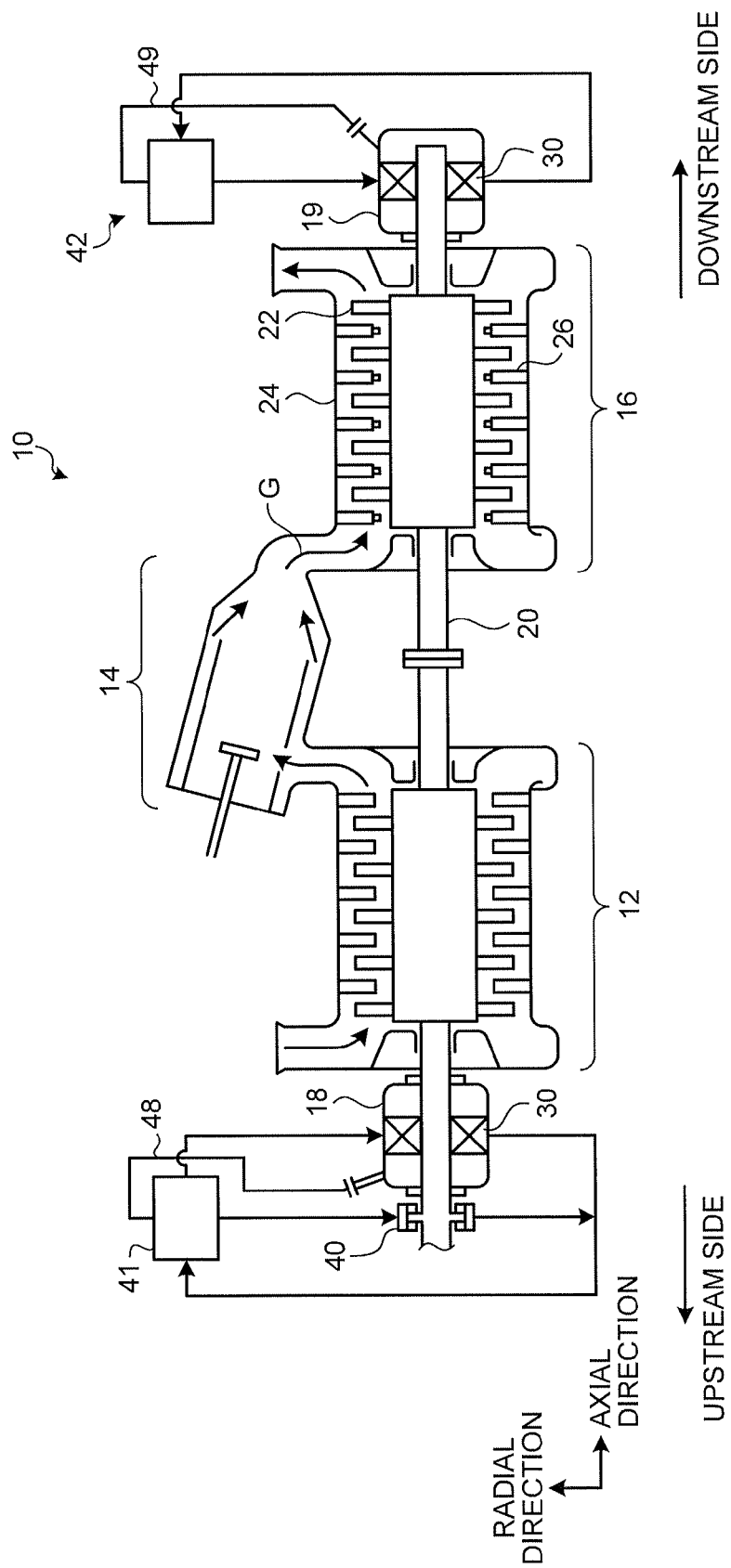
FIG. 1 is a view showing the schematic configuration of a gas turbine including a journal bearing mechanism which is one embodiment of a rotating shaft support structure.

FIG. 1 is a view showing the schematic configuration of a gas turbine including a journal bearing mechanism which is one embodiment of the rotating shaft support structure. As shown in FIG. 1, a gas turbine 10 has a compressor 12, a combustor 14, a turbine 16, a bearing device 18, a bearing device 19, and a rotating shaft 20. The parts of the gas turbine 10 are disposed inside a casing 24. In the gas turbine 10, a part of the compressor 12 and a part of the turbine 16 are fixed on the rotating shaft 20, and the gas turbine 10 rotates with the rotating shaft 20. The compressor 12 takes in and compresses air. The air compressed in the compressor 12 is supplied to the combustor 14. The combustor 14 mixes fuel into the air compressed in the compressor 12 and generates combustion gas G.

The turbine 16 introduces the combustion gas G generated in the combustor 14 to the inside thereof, expands the combustion gas G and sprays it against blades 22 provided on the rotating shaft 20, to thereby convert the thermal energy of the combustion gas G into mechanical rotary energy and generate power.

Specifically, as shown in FIG. 1, the turbine 16 includes the rotating shaft 20, the plurality of blades 22 provided on the rotating shaft 20, the casing 24 housing the rotating shaft 20 and the blades 22, and a plurality of vanes 26 fixed on the casing 24. In the turbine 16, the blades 22 and the vanes 26 are alternately arrayed in the axial direction of the rotating shaft 20. The blades 22 rotate the rotating shaft 20 with the combustion gas G which is jetted from the combustor 14 and flows in the axial direction of the rotating shaft 20. The rotary energy of the rotating shaft 20 is taken out by a mechanism, for example, a generator, coupled with the rotating shaft 20. In the following description, the side of the compressor 12 viewed from the turbine 16 (the left side on the sheet of FIG. 1) will be referred to as the upstream side, and the side of the turbine 16 viewed from the compressor 12 (the right side on the sheet of FIG. 1) will be referred to as the downstream side. The direction in which the rotating shaft 20 extends will be referred to as the axial direction, and the direction orthogonal to the axial direction will be referred to as the radial direction. The direction in which a shaft center P of the rotating shaft 20 extends will be referred to as the horizontal direction. The direction perpendicular to the horizontal plane will be referred to as the vertical direction.

The bearing device 18 is disposed further on the upstream side of the rotating shaft 20 than the compressor 12. The bearing device 18 has a journal bearing mechanism 30, a thrust bearing mechanism 40, a lubricating oil circulation mechanism 41, and a suction mechanism 48. The journal bearing mechanism 30 is fixed on the casing 24, receives the radial load of the rotating shaft 20, and regulates the radial movement of the rotating shaft 20 relative to the casing 24. The thrust bearing mechanism 40 is fixed on the casing 24, receives the axial load of the rotating shaft 20, and regulates the axial movement of the rotating shaft 20 relative to the casing 24. The lubricating oil circulation mechanism 41 supplies lubricating oil to the journal bearing mechanism 30 and the thrust bearing mechanism 40, and recovers and circulates the lubricating oil. The suction mechanism 48 is provided to suction air inside a space (cavity 32) formed by a bearing cover 31 which houses the journal bearing mechanism 30, and to recover oil mist of the lubricating oil. In the lubricating oil circulation mechanism 41, an exhaust fan etc. (not shown) is provided to suction air inside the space and keep the space at a reduced pressure. Oil mist contained in the air sent from the suction mechanism 48 to the lubricating oil circulation mechanism 41 is separated from the air and accumulated in the lubricating oil circulation mechanism 41 along with oil drain DR recovered in the journal bearing. Recovered lubricating oil L is pressurized and supplied to the bearing mechanism by a supply pump (not shown). Thus, the suction mechanism 48 can recover the mist of the lubricating oil, which has mixed into the air inside the space formed in the journal bearing mechanism 30, and return it to the lubricating oil circulation mechanism 41. As the air is suctioned from the space by the suction mechanism 48, the space is always kept at a reduced pressure, so that the oil mist can be prevented from leaking from the bearing cover to the outside.

The bearing device 19 is provided at the end of the rotating shaft 20 on the turbine 16 side. The bearing device 19 has a journal bearing mechanism 30, a lubricating oil circulation mechanism 42, and a suction mechanism 49. The journal bearing mechanism 30 is fixed on the casing 24, receives the radial load of the rotating shaft 20, and regulates the radial movement of the rotating shaft 20 relative to the casing 24. The lubricating oil circulation mechanism 42 supplies lubricating oil to the journal bearing mechanism 30, and recovers and circulates the lubricating oil. The suction mechanism 49 has the same function as the suction mechanism 48, and suctions the air inside the cavity 32 formed in the journal bearing mechanism 30 so that the oil mist can be prevented from leaking from the cavity 32 of the journal bearing to the outside. The gas turbine 10 is thus configured, and the bearing devices 18, 19 support the rotating shaft 20 on the casing 24.

Figure 2:
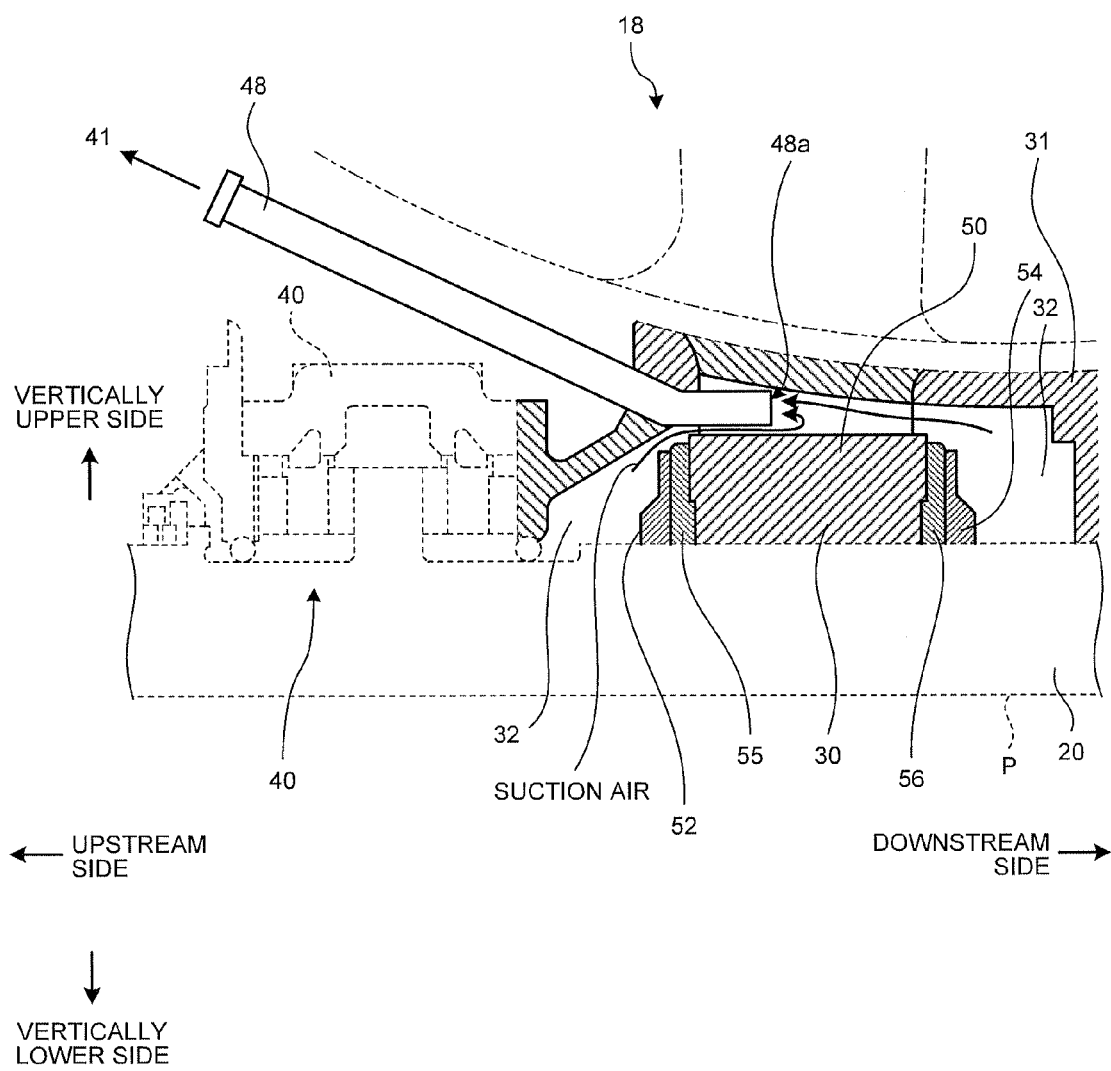
FIG. 2 is a cross-sectional view from the radial direction of a rotating shaft showing the schematic configuration of the journal bearing mechanism of the embodiment.

Next, the journal bearing mechanism 30, which is one example of the rotating shaft support structure for supporting a rotating shaft, will be described using FIG. 2 to FIG. 12. While in this embodiment the journal bearing mechanism 30 of the bearing device 18 will be described, it is preferable that the journal bearing mechanism 30 of the bearing device 19 has the same configuration. First, the schematic configuration of the journal bearing mechanism 30 will be described using FIG. 1 and FIG. 2. FIG. 2 is a cross-sectional view showing the schematic configuration of the journal bearing mechanism of this embodiment.

As shown in FIG. 1, the journal bearing mechanism 30 is surrounded by the casing 24. As shown in FIG. 2, the journal bearing mechanism 30 is disposed surrounded by the bearing cover, and has a journal bearing 50, side plates 55, 56, and scattering prevention plates 52, 54. The space surrounded by the bearing cover 31, which houses the journal bearing 50, forms the cavity 32.

The journal bearing (bearing) 50 is disposed on the outer periphery of the rotating shaft 20, and the inner peripheral surface of the journal bearing 50 faces the rotating shaft 20. The journal bearing 50 is fixed on the casing 24. The journal bearing 50 is supplied with the lubricating oil L from the lubricating oil circulation mechanism 41. With the supplied lubricating oil L, the journal bearing 50 forms a lubricating oil film between the journal bearing 50 and the rotating shaft 20. The supplied lubricating oil is discharged as the oil drain DR from the clearance between the journal bearing and the rotating shaft 20, and basically falls vertically downward from the rotating shaft 20, and is accumulated at the bottom of the cavity 32. The recovered oil drain DR is recirculated and reused along with the oil mist recovered in the lubricating oil circulation mechanism 41. The side plates 55, 56 are mounted at both ends in the axial direction of the journal bearing 50 so as to cover the entire circumference of the journal bearing 50 around the rotating shaft 20 from the axial direction.

The scattering prevention plate 52 is fixed on the journal bearing 50 on the upstream side in the axial direction, namely, on the surface on the thrust bearing mechanism 40 side. The scattering prevention plate 54 is fixed on the surface of the journal bearing 50 on the downstream side in the axial direction. The shape and the function of the scattering prevention plates 52, 54 will be described later. Next, the suction mechanism 48 has a suction opening 48a formed inside the cavity 32, where the journal bearing 50 is disposed, inside a space of the journal bearing 50 on the vertically upper side. A preferable position of the suction opening 48a is on the outer peripheral side of the journal bearing 50 in the radial direction, and inside the cavity 32 in the middle of the thickness of the journal bearing 50 in the axial direction. If the suction opening 48a is disposed at this position, spattered oil SL is unlikely to flow directly into the suction opening 48a.

Figure 3:
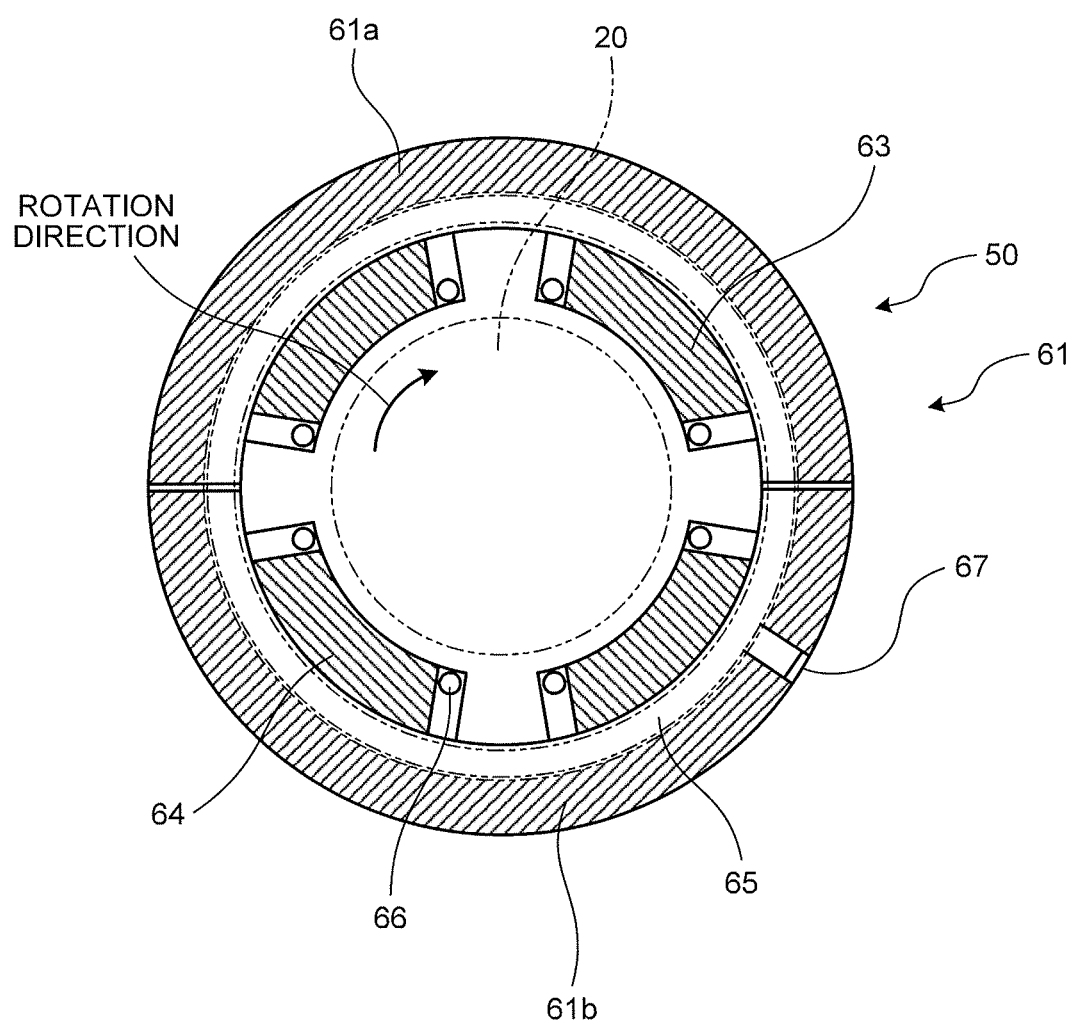
FIG. 3 is a cross-sectional view from the axial direction of the rotating shaft showing the schematic configuration of the journal bearing mechanism of the embodiment.
Figure 4:
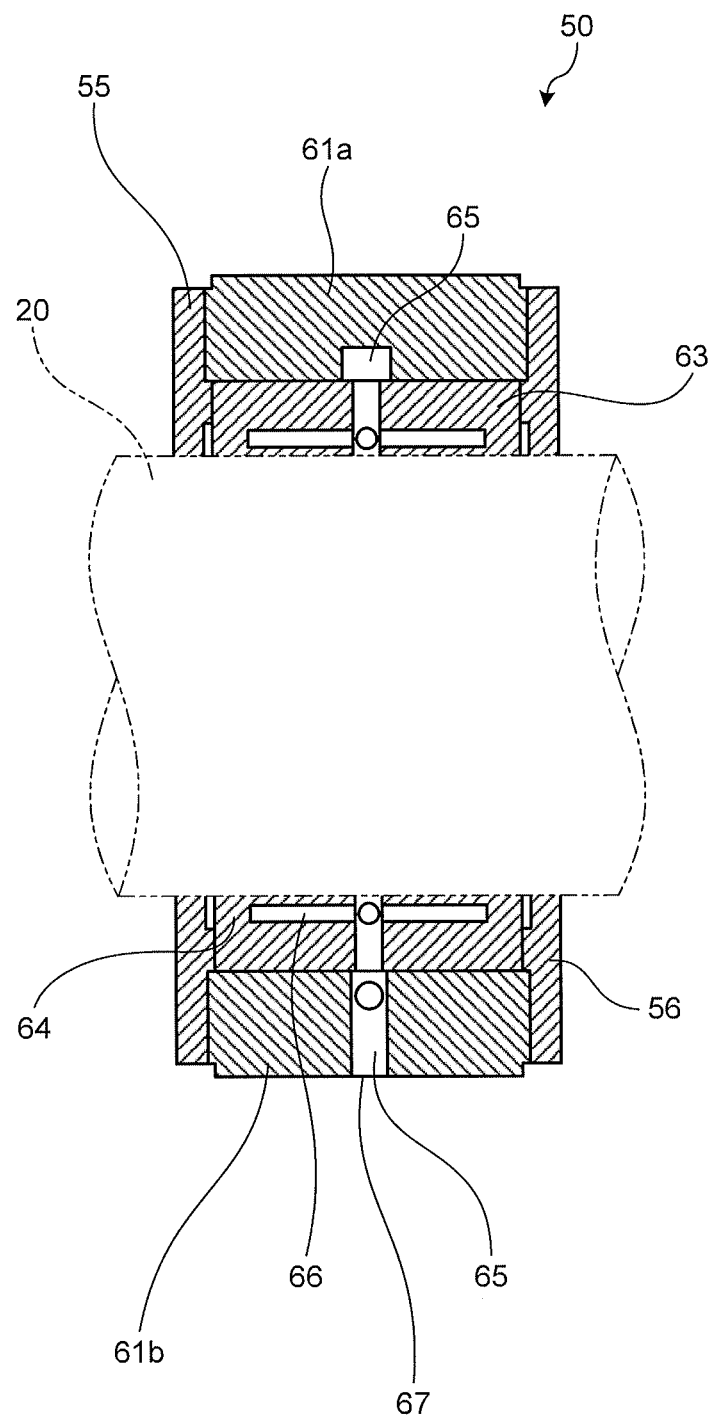
FIG. 4 is a cross-sectional view from the radial direction of the rotating shaft showing the schematic configuration of the journal bearing mechanism of the embodiment.

Next, the schematic structure of the journal bearing 50 will be described using FIG. 3 and FIG. 4. FIG. 3 is a front view showing the schematic configuration of the journal bearing 50 to which the direct lubrication method of this embodiment is applied. The journal bearing 50 is a tilting pad journal bearing, and has a carrier ring 61, an upper bearing pad 63, a lower bearing pad 64, and oil supply nozzles 66.

The carrier ring 61, which is a housing of the bearing, is composed of an upper carrier ring 61*a* and a lower carrier ring 61*b*. The upper carrier ring 61*a* and the lower carrier ring 61*b* are coupled to each other through bolt fastening etc. The outer peripheral surface of the upper bearing pad 63 is in contact with the inner peripheral surface of the upper carrier ring 61*a*. The lower bearing pad 64 is disposed on the radially inside, with its outer peripheral surface in contact with the inner peripheral surface of the lower carrier ring 61*b*.

The upper bearing pad 63 and the lower bearing pad 64 are provided with the plurality of oil supply nozzles 66 at both ends in the circumferential direction and on the inner peripheral surface side of an intermediate part. The oil supply nozzles 66 are disposed in the axial direction parallel to the rotating shaft. The lower carrier ring 61*b* is provided with an oil supply hole 67 through which lubricating oil is supplied to the journal bearing 50. The oil supply hole 67 is connected with an oil passage 65 which is drilled in the circumferential direction on the inner peripheral side of the upper carrier ring 61*a* and the lower carrier ring 61*b*. The oil passage 65 branches radially inward to communicate with the oil supply nozzles 66. The oil supply nozzle 66 has a plurality of openings on the inner peripheral surface side of the rotating shaft 20. The above-described structure is one example of the structure of the journal bearing based on the direct lubrication method, and any other publicly known structure, for example, the structure shown in Patent Literature 1 may be adopted, as long as it is a journal bearing based on the direct lubrication method.

Figure 5:
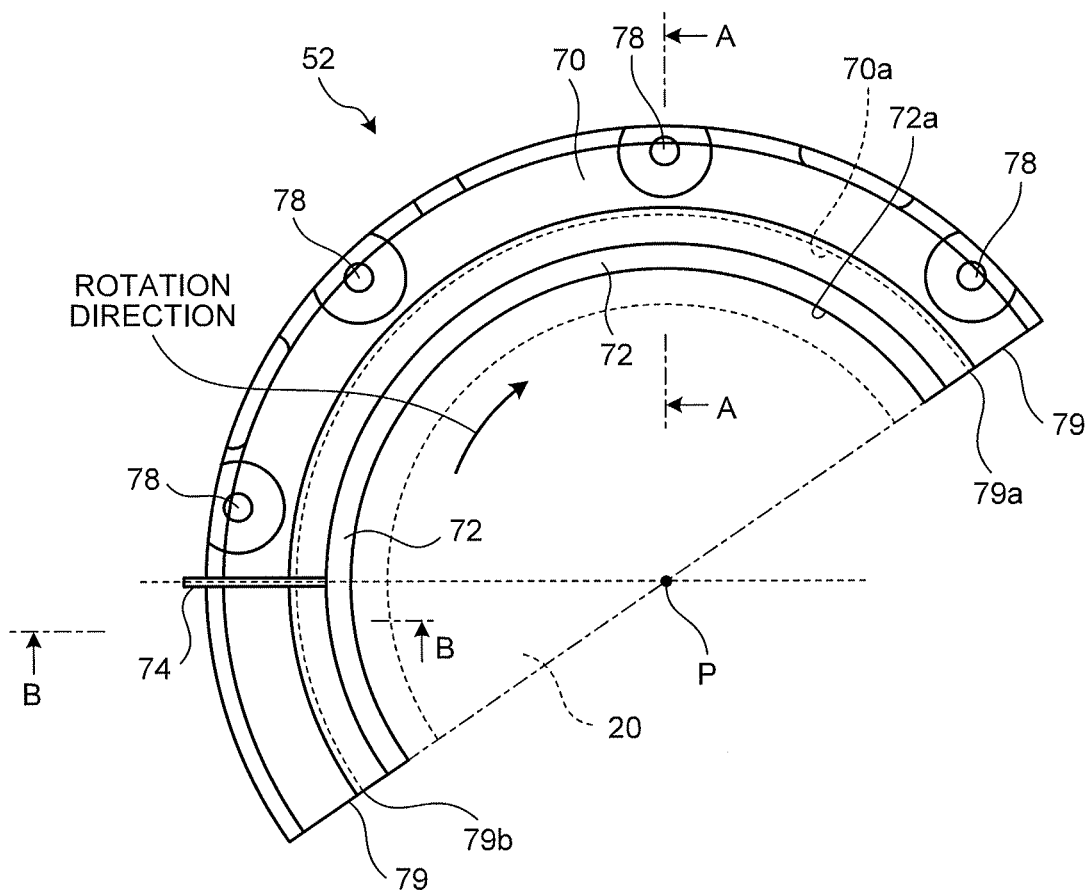
FIG. 5 is a front view showing the schematic configuration of one scattering prevention plate of the embodiment.
Figure 6:
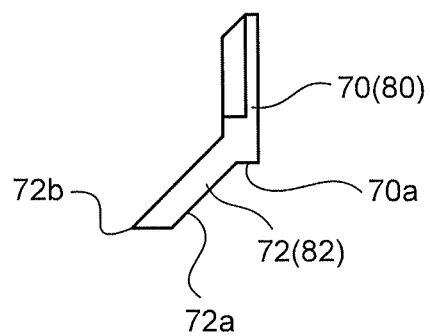
FIG. 6 is a cross-sectional view along the line A-A of FIG. 5.
Figure 7:
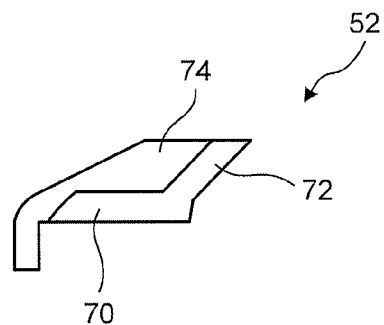
FIG. 7 is a cross-sectional view along the line B-B of FIG. 5.
Figure 8:
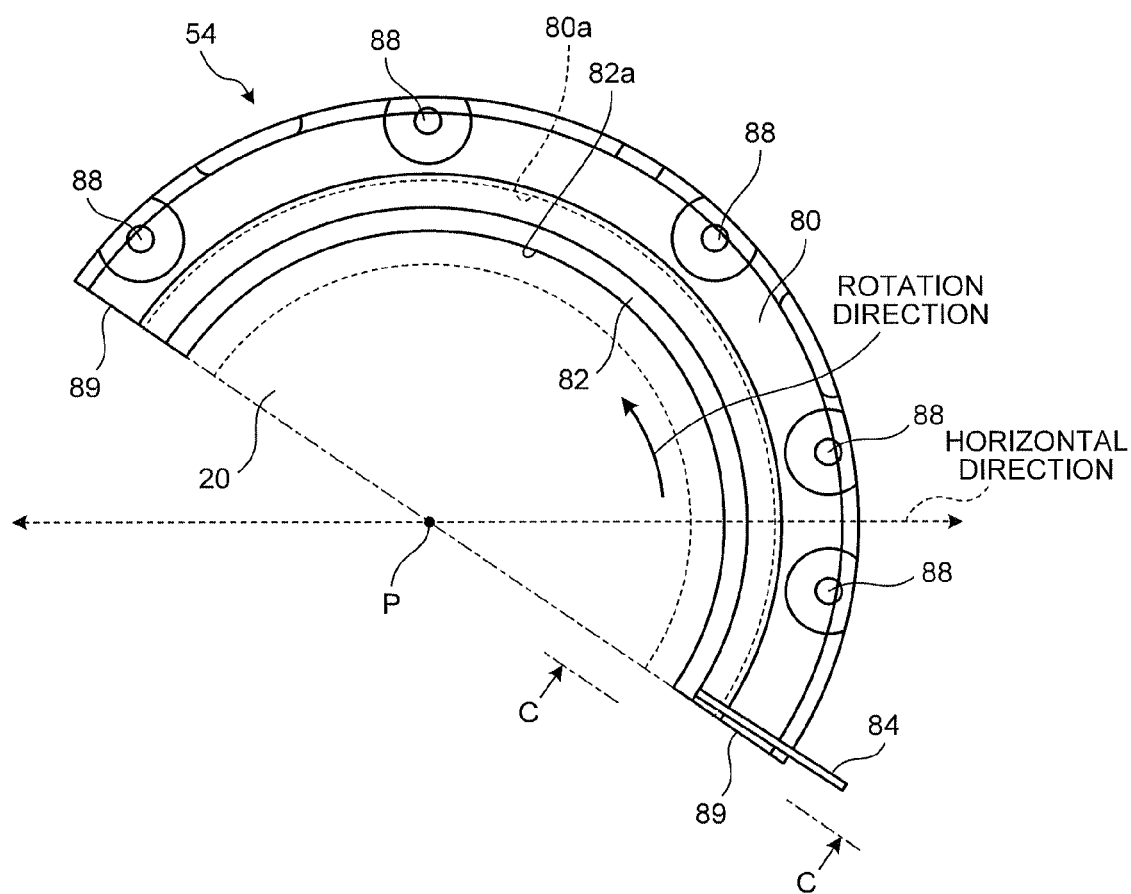
FIG. 8 is a front view showing the schematic configuration of the other scattering prevention plate of the embodiment.
Figure 9:
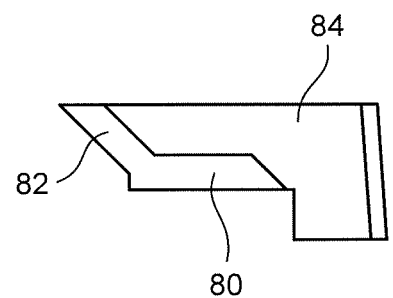
FIG. 9 is a cross-sectional view along the line C-C of FIG. 8.
Figure 10:
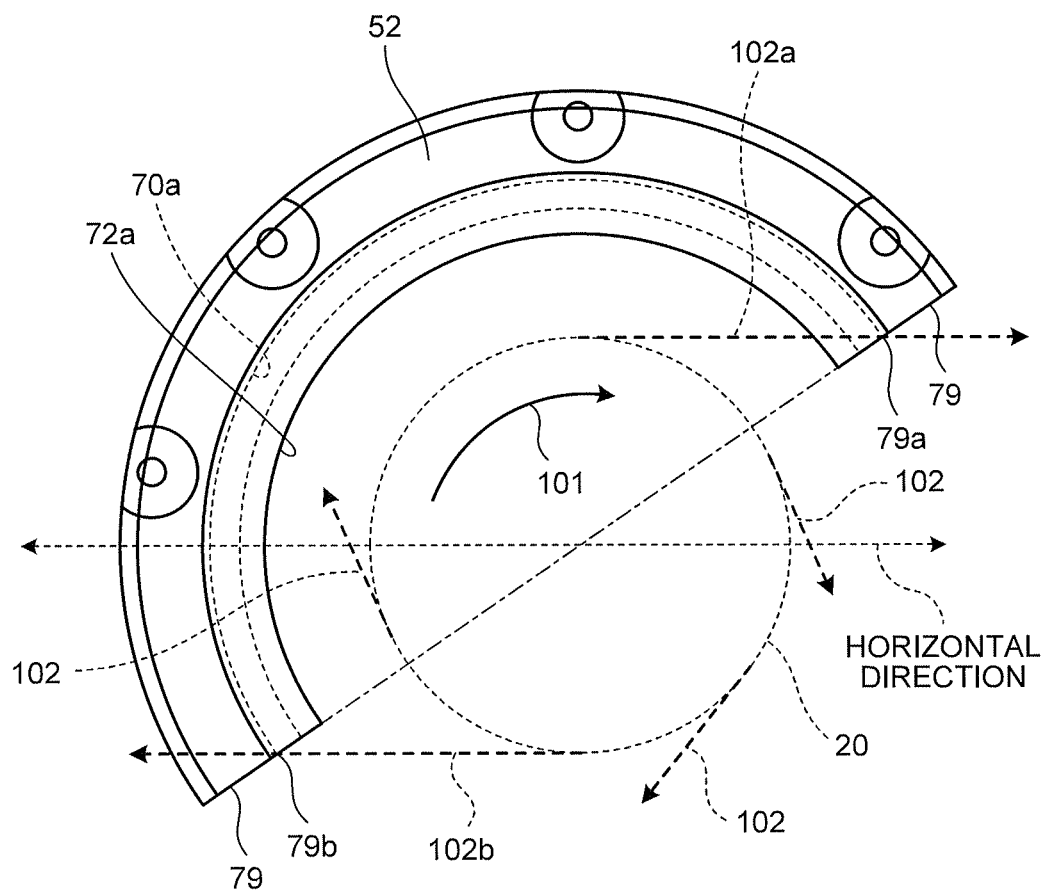
FIG. 10 is a view illustrating the function of the scattering prevention plate of the embodiment.
Figure 11:
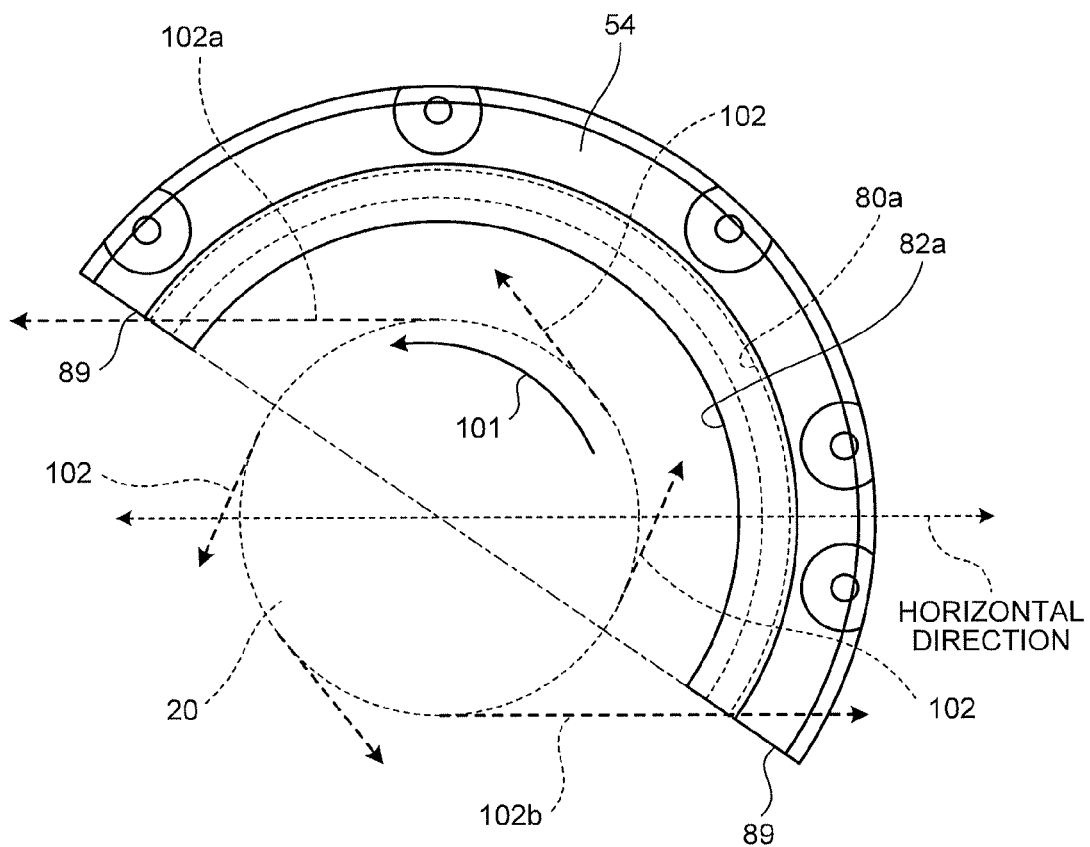
FIG. 11 is a view illustrating the function of the scattering prevention plate of the embodiment.
Figure 12:
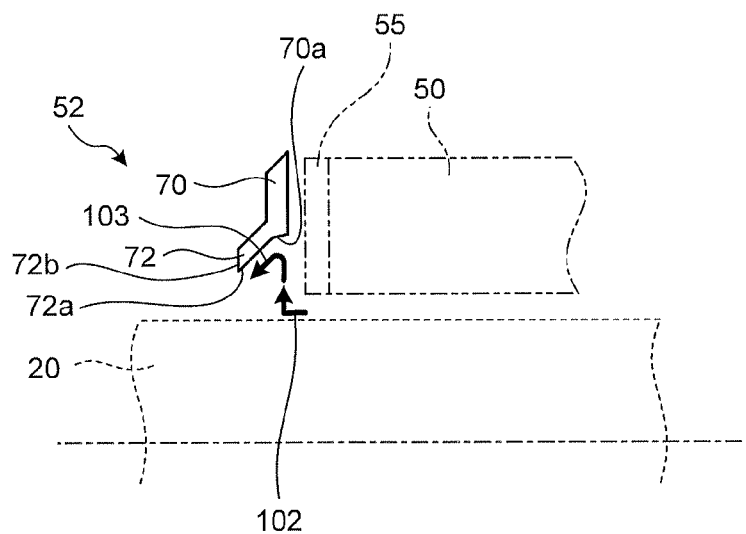
FIG. 12 is a view illustrating the function of the scattering prevention plate of the embodiment.
Figure 13:
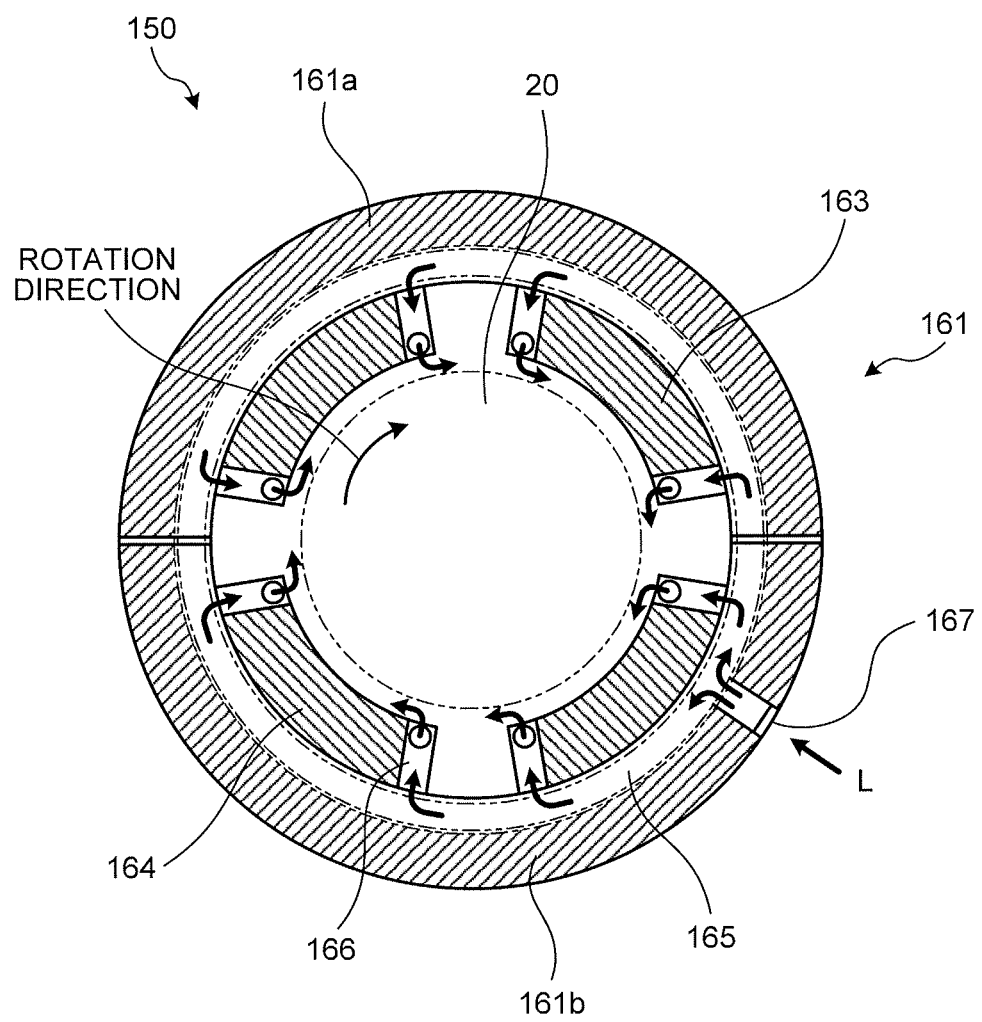
FIG. 13 is a view from the axial direction of the rotating shaft showing the flow of lubricating oil.

Next, the scattering prevention plates 52, 54 will be described using FIG. 5 to FIG. 12 in addition to FIG. 2. FIG. 5 is a front view showing the schematic configuration of one scattering prevention plate of this embodiment. FIG. 6 is a cross-sectional view along the line A-A of FIG. 5. FIG. 7 is a cross-sectional view along the line B-B of FIG. 5. FIG. 8 is a front view showing the schematic configuration of the other scattering prevention plate of this embodiment. FIG. 9 is a cross-sectional view along the line C-C of FIG. 8. FIG. 10 to FIG. 12 are views illustrating the function of the scattering prevention plates of this embodiment.

As shown in FIG. 2 and FIG. 5, the scattering prevention plate 52 is a member disposed on the journal bearing 50 on the upstream side in the axial direction, and has the shape of a ring shape with an inner diameter larger than the rotating shaft 20 and an outer diameter substantially equal to the outer diameter of the journal bearing 50. The scattering prevention plate 52 has the shape of a ring cut into a semicircle (180-degree) portion in the direction (rotation direction) around the axis of the rotating shaft 20. That is, the disposition area of the scattering prevention plate 52 in the rotation direction is a half of the entire circumference. The scattering prevention plate 52 covers a portion of the journal bearing 50 on the vertically upper side, with a line connecting two end surfaces 79 of the scattering prevention plate 52 in the rotation direction inclined from the horizontal direction. Specifically, when the two end surfaces 79 are viewed from the upstream side in the axial direction, the scattering prevention plate 52 is rotated from the horizontal direction by a certain angle in the opposite direction of the rotation direction.

As shown in FIG. 5 and FIG. 6, an annular plate portion of the scattering prevention plate 52 on the radially outside is a base part 70 and is in contact with the journal bearing 50. The portion of the scattering prevention plate 52 on the radially inside from the base part 70 is an inclined part 72 which is inclined relative to the base part 70. The inclined part 72 is inclined in a direction away from the journal bearing 50, on which the base part 70 is fixed, in the axial direction as the inclined part 72 extends radially inward. An inner peripheral surface 72*a* of the inclined part 72 on the side facing the rotating shaft 20 is continuously connected with an inner peripheral end 70*a* of the base part 70. At the end of the inclined part 72 on the upstream side in the axial direction, an acute-angled end portion 72*b* is formed.

As shown in FIG. 5 and FIG. 7, the scattering prevention plate 52 is provided with a protruding part 74 in the horizontal direction on the rear side in the rotation direction. The protruding part 74 is disposed on the surface of the base part 70 and the inclined part 72 opposite from the surface in contact with the journal bearing 50 in the axial direction, and protrudes from the surface of the base part 70 in the axial direction of the rotating shaft 20. The protruding part 74 protrudes farther radially outward than the end of the base part 70 on the radially outside. The base part 70 of the scattering prevention plate 52 is provided with a plurality of bolt holes 78 into which bolts for fastening the scattering prevention plate 52 onto the journal bearing 50 are inserted.

As shown in FIG. 2 and FIG. 8, the scattering prevention plate 54 is a member disposed on the journal bearing 50 on the downstream side in the axial direction, and has the shape of a ring with an inner diameter larger than the rotating shaft 20 and an outer diameter substantially equal to the outer diameter of the journal bearing 50. The scattering prevention plate 54 has the shape of a ring cut into a semicircle (180-degree) portion in the direction (rotation direction) around the axis of the rotating shaft 20. That is, the disposition area of the scattering prevention plate 54 in the rotation direction is also a half of the entire circumference. The scattering prevention plate 54 covers a portion of the journal bearing 50 on the vertically upper side, with a line connecting two end surfaces 89 of the scattering prevention plate 54 in the rotation direction inclined from the horizontal direction. Specifically, when the two end surfaces 89 are viewed from the downstream side in the axial direction, the scattering prevention plate 54 is rotated from the horizontal direction by a certain angle in the opposite direction to the rotation direction. Therefore, when viewed from the axial direction, the position of the scattering prevention plate 54 in the rotation direction overlaps the scattering prevention plate 52.

The basic cross-sectional shape of the scattering prevention plate 54 is the same as that of the scattering prevention plate 52. Specifically, the basic cross-sectional shape of the scattering prevention plate 54 is the same shape as the cross-section along the line A-A shown in FIG. 6. An annular plate portion of the scattering prevention plate 54 on the radially outside is a base part 80 and is in contact with the journal bearing 50. The portion of the scattering prevention plate 54 on the radially inside from the base part 80 is an inclined part 82 which is inclined relative to the base part 80. The inclined part 82 is inclined in a direction away from the journal bearing 50, on which the base part 80 is fixed, in the axial direction as the inclined part 82 extends radially inward. The shape of the inclined part 82 is substantially the same as that of the inclined part 72.

As shown in FIG. 8 and FIG. 9, the scattering prevention plate 54 is provided with a protruding part 84 at a position on the lowermost side in the vertical direction. The protruding part 84 is disposed on the surface of the base part 80 and the inclined part 82 opposite from the surface in contact with the journal bearing 50 in the axial direction, and protrudes from the surface of the base part 80 in the axial direction of the rotating shaft 20. The base part 80 of the scattering prevention plate 54 is provided with a plurality of bolt holes 88 into which bolts for fastening the scattering prevention plate 54 onto the journal bearing 50 are inserted.

Figure 14:
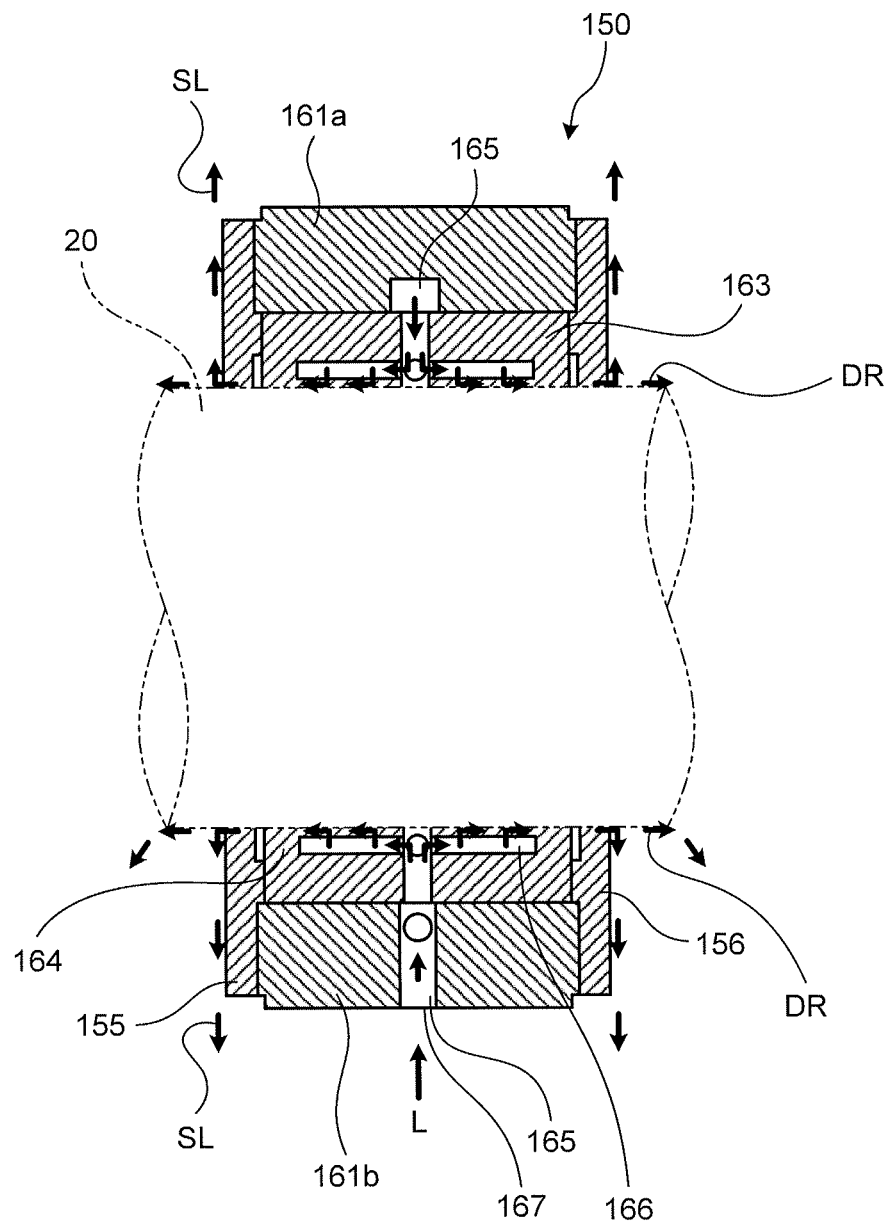
FIG. 14 is a view from the radial direction of the rotating shaft showing the flow of lubricating oil.

The scattering prevention plates 52, 54 have the shape as described above. As shown in FIG. 10 to FIG. 12, since the journal bearing mechanism 30 is provided with the scattering prevention plates 52, 54, it can prevent the lubricating oil L, which is discharged in the axial direction from between the rotating shaft 20 and the journal bearing 50, from scattering as the spattered oil SL to the vertically upper side relative to the rotating shaft 20. That is, as described with the bearing 150 shown in FIG. 14, the lubricating oil L supplied to the journal bearing 50 is discharged from the clearance between the side plates 55, 56 disposed at both ends in the axial direction and the rotating shaft 20 to the sides of the scattering prevention plates 52, 54 along the rotating shaft 20. As shown in FIG. 10, FIG. 11, and FIG. 12, the lubricating oil L discharged from the side plates 55, 56 tries to scatter in the radially outward direction (arrows 102) along the side wall of the side plates 55, 56 due to the centrifugal force of the rotating shaft 20. In the case of the region surrounded by the scattering prevention plate 52, the lubricating oil L having flowed out along the surface of the rotating shaft 20 flows temporarily along the side wall of the side plate 55 in the radially outward direction as indicated by the arrow 102 of FIG. 12. After having flowed in the radially outward direction along the side wall of the side plate 55, the lubricating oil L hits the inner peripheral end 70a of the base part 70 and the inner peripheral surface 72a of the inclined part 72, and as indicated by an arrow 103, forms a flow turning back to the radially inside, in the direction in which the inclined part 72 is inclined. Therefore, it is unlikely that the lubricating oil, which has flowed away from the end portion 72b of the inclined part 72, flows from the end portion 72b on the radially outside along the outer peripheral surface of the inclined part and scatters as the spattered oil SL. Here, in this embodiment, as shown in FIG. 10 and FIG. 11, since the rotating shaft 20 rotates in the direction of an arrow 101, the discharged lubricating oil L is discharged in the axial direction along the surface of the rotating shaft 20, and due to the centrifugal force of the rotating shaft 20, is discharged in the direction of the arrow 102, which is the tangential direction of the surface of the rotating shaft 20 as well as the direction toward the front side in the rotation direction.

As shown in FIG. 10 and FIG. 11, the semicircular ring-shaped scattering prevention plates 52, 54 of the journal bearing mechanism 30 are disposed at the positions rotated by a predetermined angle from the positions at which the scattering prevention plates 52, 54 cover the upper half of the rotating shaft 20 in the horizontal and vertical directions. In this embodiment, the scattering prevention plates 52, 54 are rotated by an angle not larger than 90 degrees. Specifically, it is preferable that the scattering prevention plates 52, 54 are disposed in a region where the region formed by the inner peripheral surfaces 72a, 82a of the inclined parts 72, 82, that is, the region (inner peripheral region) surrounded by the inner peripheral end 70a of the base part 70 and the radial end portion 72b of the inclined part 72, overlaps the tangent line of the surface of the rotating shaft 20 when the scattering prevention plates 52, 54 are viewed from the axial direction. The scattering prevention plates 52, 54 should be mounted at such an angle that, of the arrows 102 formed by the flow lines of the lubricating oil having flowed away from the surface of the rotating shaft 20, the tangent line directed vertically upward relative to the horizontal direction hits the inner peripheral surface 72a of the inclined part 72. That is, in FIG. 10, the mounting angle should be such that an arrow 102a, which indicates a tangent line passing through an inner peripheral edge 79a at which the inner peripheral end 70a of the base part 70 on the frontmost side in the rotation direction and the end surface 79 intersect, is parallel to the horizontal direction or is directed vertically downward Thus, as shown in FIG. 12, the scattering prevention plates 52, 54 can bring the lubrication oil, which has been discharged in the horizontal direction or to the vertically upper side from the horizontal direction, into contact with the inner peripheral surface 72a (82a) of the inclined part 72 (82). The lubricating oil coming into contact with the inner peripheral surface 72a (82a) of the inclined part 72 (82) is turned in traveling direction from the radially outward direction to the opposite direction. That is, due to the inclined part 72 (82), the lubricating oil is turned in flow direction to the horizontal direction or a direction inclined to the vertically lower side from the horizontal direction, which is the radially inward direction, and falls down to the bottom of the cavity 32 as the oil drain DR.

In FIG. 10, in the case of the region on the vertically lower side of the rotating shaft 20 where the scattering prevention plate 52 is not present, as the direction of the arrow 102, which indicates the tangent line formed by the flow line of the major part of the lubricating oil, is a direction downward in the rotation direction relative to the horizontal direction, it is unlikely that the lubricating oil scatters as the spattered oil SL into the cavity 32. However, it is preferable that the mounting angle of the scattering prevention plate 52 is such that an arrow 102b, which indicates a tangent line passing through the inner peripheral end 79b intersecting the end surface 79 on the rearmost side in the rotation direction of the inner peripheral surface 72a of the inclined part 72, is parallel to the horizontal direction or is directed vertically downward.

Thus, since the journal bearing mechanism 30 is provided with the scattering prevention plates 52, 54, it can guide the lubricating oil, which is discharged from between the journal bearing 50 and the rotating shaft 20 and scatters in the radially outward direction, to the vertically lower side relative to the horizontal direction. That is, as the lubricating oil scattering in the radial direction is guided to the vertically lower side by the scattering prevention plates 52, 54, it is possible to prevent the lubricating oil from being discharged to the vertically upper side on the outside of the journal bearing 50 in the radial direction and scattering into the cavity 32 as the spattered oil SL. The lubricating oil having flowed vertically downward from the rotating shaft 20 is accumulated at the bottom of the cavity 32 as the oil drain DR, and is sent back to the lubricating oil circulation mechanisms 41, 42.

Thus, it is possible to suppress the influence of the lubricating oil on other devices disposed around the journal bearing 50. For example, even when the air inside the space where the journal bearing 50 is disposed is suctioned and the suction mechanism 48 is provided as in this embodiment, it is possible to prevent the scattering lubricating oil from reaching the surrounding of the suction opening 48a. Thus, the suction mechanism 48 can be prevented from suctioning the spattered oil SL, which is liquid drops of the lubricating oil, when suctioning the air containing the lubricating oil in the form of mist. Thus, it is possible to prevent clogging of the suction opening 48a etc. caused by the suction mechanism 48 suctioning the spattered oil SL. Accordingly, it is possible to suppress the influence of the lubricating oil on other devices such as clogging, and to operate the rotary machine stably over a prolonged period of time.

If the scattering prevention plates 52, 54 are provided with the inclined parts 72, 82 as in this embodiment, the lubricating oil can be captured by the scattering prevention plates 52, 54 with a higher probability, and the lubricating oil can be guided to the vertically lower side. Thus, the possibility of the lubricating oil influencing other devices can be reduced. Accordingly, it is possible to suppress the influence of the lubricating oil on other devices such as clogging, and to operate the rotary machine stably over a prolonged period of time.

If the scattering prevention plates 52, 54 are provided with the protruding parts 74, 84, even when the lubricating oil etc. reflected on other portions splashes back to the vertically upper side, the movement of the lubricating oil to the vertically upper side can be blocked. Thus, the possibility of the lubricating oil influencing other devices can be further reduced. A plurality of protruding parts 74, 84 may be disposed in the rotation direction.

Since the scattering prevention plates can achieve the above-described various effects, it is preferable that the scattering prevention plates have the various shapes described in this embodiment. However, the scattering prevention plates are not limited to this embodiment. For example, the disposition area of the scattering prevention plate in the rotation direction is not limited to an area of 180 degrees, as long as the condition is satisfied that the tangent line formed by a flow line of the lubricating oil having flowed away from the surface of the rotating shaft overlaps the inner peripheral region of the scattering prevention plate. The angle may be 90 degrees, 170 degrees, or 250 degrees. If the scattering prevention plate covers an area of 180 degrees, it can favorably capture the lubricating oil which is discharged in the horizontal direction or in a direction inclined to the vertically upper side from the horizontal direction. While it is preferable that the scattering prevention plate is provided with the inclined part and the protruding part, the scattering prevention plate is not limited to this example. Instead of the inclined part, a shielding part parallel to the axial direction may be provided. The cross-sectional shape of the radially inner surface of the scattering prevention plate may be linear or curved or a combination of these.

While it is preferable that the journal bearing mechanism has the scattering prevention plates disposed at both ends in the axial direction as in this embodiment, the scattering prevention plate may be provided at only one side. If the journal bearing mechanism includes a suction mechanism, it is preferable that the scattering prevention plate is provided on the end surface of the journal bearing in the axial direction on the side where the suction opening is provided. Thus, it is possible to favorably prevent the lubricating oil from reaching the suction opening.

While in this embodiment the journal bearing mechanism has the scattering prevention plates fixed on the journal bearing, the present invention is not limited to this example. As long as scattering of the lubricating oil discharged from between the journal bearing and the rotating shaft can be prevented, the scattering prevention plate may be supported by any part other than the journal bearing. For example, the scattering prevention plate may be fixed on the casing.

It is possible to more favorably suppress the influence of the discharged lubricating oil by applying the rotating shaft support structure to the journal bearing mechanism as in this embodiment. The rotating shaft support structure may also be provided in a thrust bearing mechanism other than the journal bearing mechanism.

The invention claimed is:

1. A rotating shaft support structure comprising:
a bearing configured to support a rotating shaft extending in an axial direction along a horizontal plane and having a surface facing the rotating shaft supplied with lubricating oil by a direct lubrication method, the bearing being disposed inside a cavity holding a suction mechanism for recovering a mist of the lubricating oil from within the cavity and
at least one scattering prevention plate disposed on a side of an end surface of the bearing and extending in the axial direction, the at least one scattering prevention plate being positioned on an upper side of the rotating shaft,
wherein the scattering prevention plate has an inclined part, which is inclined in a direction extending away from the bearing in the axial direction as the inclined part extends radially inward with respect to the rotating shaft support structure.

2. The rotating shaft support structure according to claim 1, wherein the scattering prevention plate is fixed on the bearing.

3. The rotating shaft support structure according to claim 1, comprising two scattering prevention plates, wherein one scattering prevention plate is disposed on the side of one end surface of the bearing and extending in the axial direction, while the other scattering prevention plate is disposed on a side of another end surface of the bearing and extending in the axial direction.

4. The rotating shaft support structure according to claim 1, wherein the bearing is a journal bearing.

5. A rotary machine comprising the rotating shaft support structure according to claim 1.

6. A rotary machine comprising the rotating shaft support structure according to claim 3.

7. A rotary machine comprising the rotating shaft support structure according to claim 4.

* * * * *